April 1, 1958    K. VAN WAVEREN    2,829,007
PROCESS AND DEVICE FOR FEEDING A PULVERIZED
MATERIAL, E. G. A PULVERIZED CATALYST
Filed Oct. 7, 1954
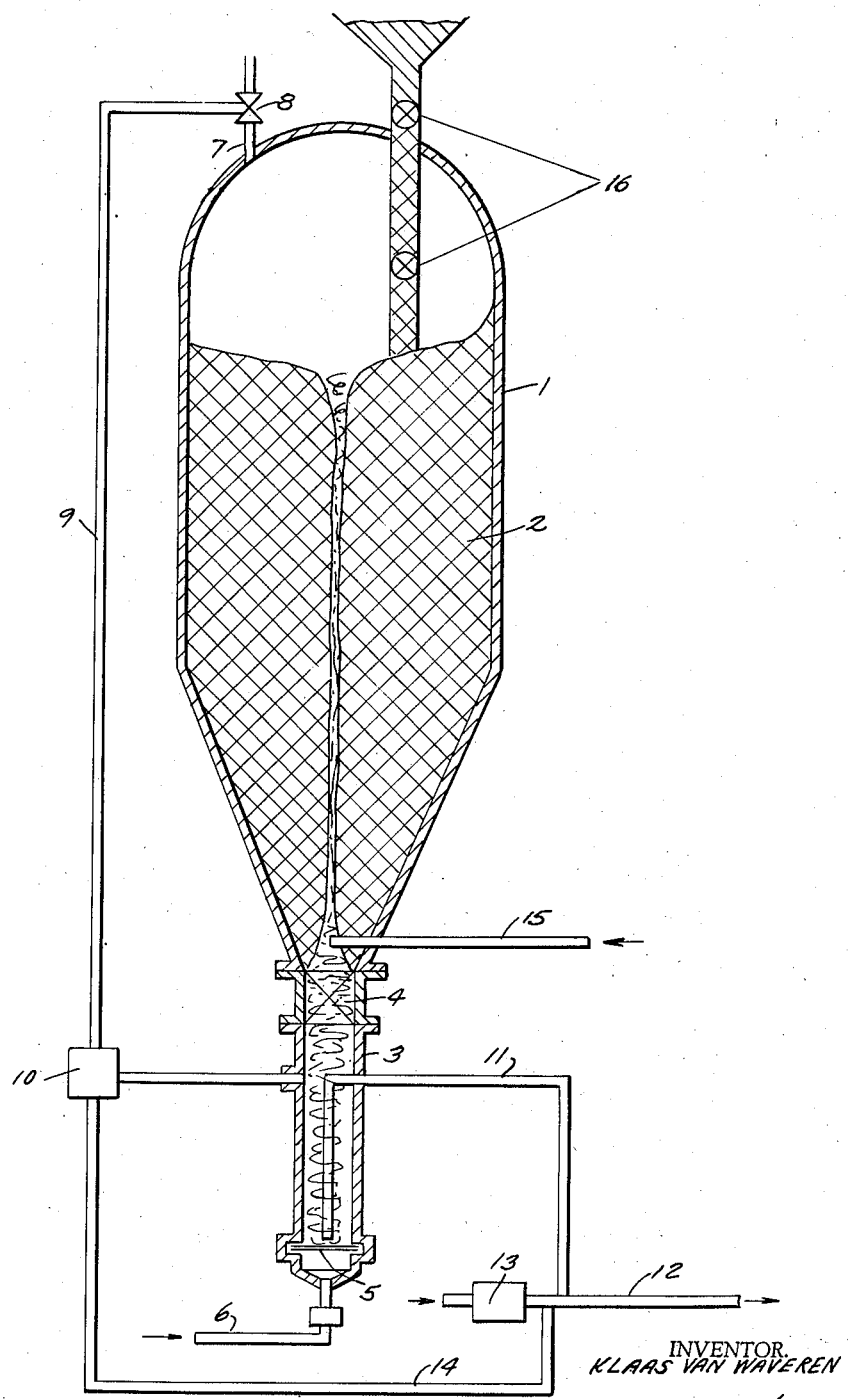
INVENTOR.
KLAAS VAN WAVEREN
BY
ATTORNEYS

2,829,007

PROCESS AND DEVICE FOR FEEDING A PULVERIZED MATERIAL, E. G., A PULVERIZED CATALYST

Klaas van Waveren, Amsterdam, Netherlands, assignor to Koninklijke Zwavelzuurfabrieken v/h Ketjen N. V., Amsterdam, Netherlands, a limited-liability company of the Netherlands Application October 7, 1954, Serial No. 460,994

Claims priority, application Netherlands November 20, 1953

3 Claims. (Cl. 302—53)

The invention relates to a method of and apparatus for feeding a pulverulent material from one container to another, for example, for delivering measured quantities of a pulverulent catalyst from a hopper to a reaction space in which a fluidized catalyst is present.

During the course of catalyzed chemical reactions, including for example catalytic cracking of petroleum oil, employing a fluidized bed of catalyst, loss of catalyst is an inherent attribute of the fluidization techniques. The losses which result from gas entrainment, attrition, etc. occur at a relatively uniform rate.

With reactions in which the catalyst is in a fluidized state, it is often necessary to supply the catalyst regularly to make up for losses and for the decrease in catalytic activity. For this purpose it may be advantageous that the fresh catalyst is supplied at a uniform rate to the reaction vessel. In practice this presents a difficult problem, since either too little or too much catalyst is supplied to the reaction vessel per unit period.

It is known from the British patent specification 478,749 to transfer pulverulent material from a container to a fluidizing space situated below said container. From this space the fluidized material is blown by means of a stream of gas to a line leading to the reaction space. The control is carried out by means of a valve in this line.

According to the invention one has succeeded in feeding pulverulent material, such as finely divided catalyst, at a uniform rate to a space, for instance a reaction space, in which said material is used in a fluidized state.

According to the invention which relates to a process in which the pulverulent material, such as finely divided catalyst, is fluidized in a chamber below the container by introducing a gas, especially air, into said chamber from the bottom thereof through a porous material, said chamber being at its top in free communication with the container and the fluidized material issuing from said fluidizing chamber to a space, such as a reaction space, through a tube, in the centre of the closed container a fluidized column is maintained, whereas the pressure in the fluidizing chamber is controlled by adjusting the pressure at the top of the container and the discharge from the fluidizing chamber is controlled by the difference in pressure between the fluidizing chamber and the reaction space.

In this manner it appeared to be possible to remove a constant uniform flow of catalyst from the container with a rate of for example 50–500 kg. per hour depending upon the rate at which the catalyst is to be supplied.

The invention also relates to an apparatus for carrying out the above described process and is further elucidated with reference to the drawings which illustrates an embodiment thereof.

The storage zone for the fresh pulverulent catalyst 2 consists of hopper 1 which hopper has a tapering bottom part. At the bottom the hopper 1 communicates with the fluidizing chamber 3, between which and the hopper is interposed a slide valve 4 which, if desired, can be cleaned by blowing with air. At the bottom of the fluidizing chamber 3 is disposed a plate of porous material 5, e. g. of porous stone. Air or another gas is supplied by this plate through a line 6. This air fluidizes the catalyst in the chamber 3, but also fluidizes the catalyst in the centre of the hopper 1 for which purpose it may be necessary to introduce additional air through the line 15. The air escapes through the line 7 having a control valve 8. Particular characteristic features of the apparatus are the application of a closed vessel as hopper 1 and that an accurate control of pressure can be effected by means of a control air line 9 having a pressure controller 10 which line 9 is connected to the control valve 8. From the fluidizing chamber 3 the fluidized catalyst is discharged through the line 11 to a line 12 leading to the reaction space. The pressure controller 13 in the line 14 additionally serves for accurate adjustment of the pressure.

During operation, a difference in pressure subsists between the discharge line 11 and the chamber 3, due to which a constant, adjustable stream of catalyst flows from the hopper 1 into the feed line to the reaction space. The necessary difference in pressure is achieved and maintained by the pressure at the top of the hopper 1 plus the weight of the column of fluidized catalyst in said hopper 1 and in the chamber 3, less the pressure in the line 12, i. e. the pressure prevailing in the feed line to the reaction space.

When the catalyst level in hopper 1 becomes low, fresh catalyst can be added by expedients known to the art including, for example through star valves 16, as shown on the drawing, without affecting the pressure relationships or the continuity of the fluidized discharge through line 12.

The rate of the flow of the catalyst depends on the dimensions of the line 11, the degree of fluidizing and the difference in pressure between the two mouths on the line 11.

It has been found in practice that in the aforedescribed manner a completely uniform feed of the pulverulent catalyst is secured.

In a catalytic cracking plant the pressure of the air in practice was 2 to 5 atm. in the line 6, the pressure at the top of the hopper 1 amounted to 1 to 3 atm. and the pressure near the mouth of the line 11 was about 2.1 atm., whilst the pressure in the feed line reaction space 12 amounted to 2 atm.

I claim:

1. A method of feeding a pulverulent material from a storage zone into a reaction zone at a predetermined rate which comprises: maintaining material fluidized in a relatively small fluidization zone below and in open communication with the larger storage zone by introducing fluidizing gas into the bottom of said fluidization zone and withdrawing same from the top of said storage zone after passing through and fluiding a central column of material in said storage zone; withdrawing fluidized material and fluidization gases from said fluidized zone; and controlling the rate of fluidized material withdrawal by adjusting the pressure of said storage zone through control of the gas being withdrawn therefrom in accord with the pressure in said fluidized zone.

2. An apparatus for storing, fluidizing and feeding of pulverulent material comprising: a relatively large hopper for pulverulent material; a relatively small fluidizing chamber below said hopper and in open communication therewith; a porous plate at the bottom of said fluidizing chamber; a feedline for gas terminating at said porous plate; a discharge line opening into said fluidizing chamber for removing fluidizing material and gas; a gas outlet line at the upper end of said hopper for removing the remainder of the fluidizing gas; and a valve on the gas outlet line actuated by pressure controlling means according to the pressure in the fluidization chamber whereby the withdrawal rate of the fluidized material is controlled.

3. The apparatus of claim 2 wherein an additional gas feedline extends to the center of the material in said hopper at the lower end thereof.

References Cited in the file of this patent

UNITED STATES PATENTS

| | | |
|---|---|---|
| 1,390,974 | Von Porat | Sept. 13, 1921 |
| 2,027,697 | Nielsen | Jan. 14, 1936 |
| 2,123,537 | Marr | July 12, 1938 |
| 2,221,741 | Vogel-Jorgensen | Nov. 12, 1940 |
| 2,509,984 | Morrow | May 30, 1950 |
| 2,602,707 | Garoutte | July 8, 1952 |
| 2,636,642 | Gorin | Apr. 28, 1953 |
| 2,723,883 | Lapple | Nov. 15, 1955 |